UNITED STATES PATENT OFFICE.

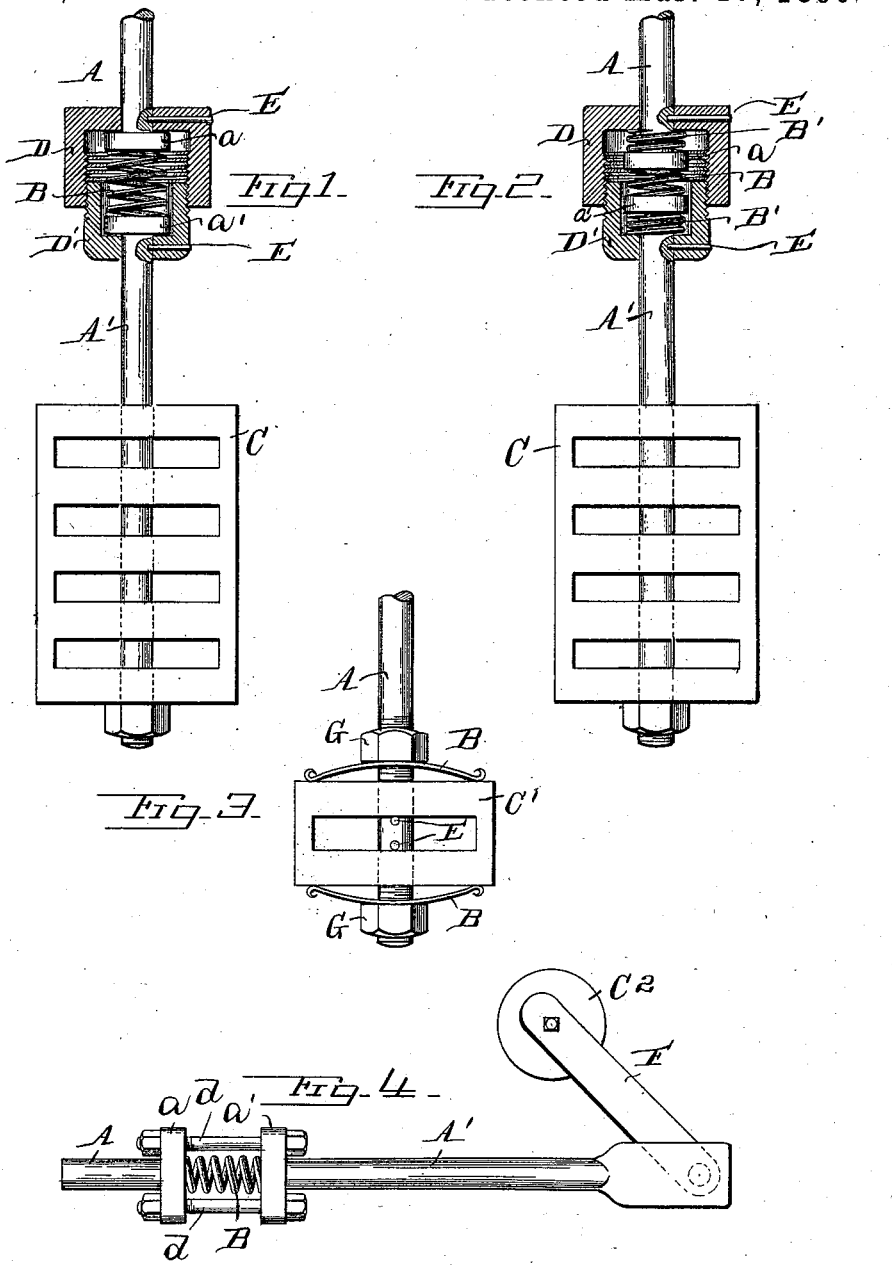

ARTHUR MARICHAL, OF PHILADELPHIA, PENNSYLVANIA, ASSIGNOR TO THE SOUTHWARK FOUNDRY AND MACHINE COMPANY, OF SAME PLACE.

VALVE.

SPECIFICATION forming part of Letters Patent No. 556,547, dated March 17, 1896.

Application filed September 6, 1893. Serial No. 484,914. (No model.)

*To all whom it may concern:*

Be it known that I, ARTHUR MARICHAL, a subject of the King of Belgium, residing in the city and county of Philadelphia, in the State of Pennsylvania, have invented a certain new and useful Improvement in Valves, of which the following is a true and exact description, reference being had to the accompanying drawings, which form a part of this specification.

My invention relates to the connection of valves with their actuating mechanism, and has for its object to provide means whereby the valve, while moving under normal conditions in obedience to the actuating mechanism, can and will remain stationary under abnormal resistance without undue strain to its connections. This I accomplish by placing in the valve-actuating connections a spring or springs, so placed and constructed as normally to constitute a rigid part of said connections, but at the same time adapted to yield, allowing the valve to remain at rest when its motion is opposed by resistance of an abnormal nature.

My invention is particularly adapted for use in connection with pump-valves which are liable to be locked by foreign objects getting caught in the valve-seats, but it is applicable as well to valves used in other connections.

Reference being now had to the drawings which illustrate my invention, Figure 1 is a plan view of a slide-valve and its valve-stem provided with my improvement. Fig. 2 shows a modified construction of similar parts; Fig. 3, another modification; and Fig. 4 shows a mode of applying my invention to cylindrical valves.

A indicates a valve-actuating rod, which in Figs. 1, 2, and 3 is in substance the valve-rod and in Fig. 4 a reciprocating rod which communicates motion to the lever F, which in turn actuates the valve $C^2$. B or B' in each case indicates the spring or springs interposed in the valve connections.

C, C', and $C^2$ indicate valves in the respective figures.

In Fig. 1 the valve-rod is made up of two parts A and A', to the latter of which the valve is rigidly attached. The parts A and A' are provided with opposing heads $a$ and $a'$, which are coupled together by means of thimbles D and D' screwing together, as shown, and forming a chamber in which, and between the heads $a$ and $a'$, is situated a spring B. Obviously under normal conditions the rods A and A' will move together, but when the rod A is moving in a direction toward the valve it can, if the valve is jammed, move without moving the valve and by merely compressing spring B. This construction will suffice in many cases, for it is most important, especially in pumps, to provide against obstructions tending to prevent the closing of the valve and less necessary to provide for the less frequent accidents which tend to prevent opening. In Fig. 2, however, I have shown a construction in which the thimbles D D' rest against springs B' B', in turn resting against heads $a\,a'$ on rods A A', said heads, as before, being held apart by spring B. Obviously this construction enables the rod A to move in either direction without moving the valve, and indeed this would be the case were only one spring B' used in connection with spring B.

In many cases it is important that the positive motion of the valve-rod should not be interfered with—as, for instance, where several valves are actuated by the same rod— and in such cases I secure the valve upon the rod by the intervention of springs—as shown, for instance, in Fig. 3, where the valve C' is clamped between two bow-springs B and B, in turn secured to the rod A.

In Fig. 4 the rods A and A' are coupled by bolts $d$ passing freely through holes in the heads $a$ and $a'$ and by a spring B situated between the heads, as in Fig. 1.

For some purposes I prefer to combine with my spring device a brake pin or pins which, as long as they remain unbroken, relieve the spring of all strain and absolutely insure the positive movement of the valve. Such brake-pins are indicated at E in Figs. 1, 2, and 3. It is obvious that the brake-pins can be used independently of the springs.

Having now described my invention, what I claim as new, and desire to secure by Letters Patent, is—

In combination with a valve and valve-actuating mechanism a brake pin or pins interposed in and constituting a part of the valve-actuating connection and a spring or springs also interposed in and constituting a part of the valve-actuating mechanism but arranged as described so as not to come into active operation until the fracture of the brake-pin.

ARTHUR MARICHAL.

Witnesses:
ALF. H. FABER,
D. STEWART.